United States Patent [19]

Hawlas et al.

[11] Patent Number: 5,894,718
[45] Date of Patent: Apr. 20, 1999

[54] DRIVE SYSTEM FOR AGRICULTURAL LARGE BALER

[75] Inventors: Martin Hawlas, Harsewinkel; Ansgar Nonhoff, Coesfeld; Egbert Scholz, Rheda, all of Germany

[73] Assignee: Class KGaA, Harsewinkel, Germany

[21] Appl. No.: 08/893,074

[22] Filed: Jul. 15, 1997

[30] Foreign Application Priority Data

Jul. 16, 1996 [DE] Germany .............. 196 28 604

[51] Int. Cl.$^6$ .............................. A01D 39/00
[52] U.S. Cl. .............. 56/341; 56/434; 56/446; 100/88
[58] Field of Search .............. 56/341, 343, 434, 56/446, 450; 100/88

[56] References Cited

U.S. PATENT DOCUMENTS

| | | |
|---|---|---|
| 2,676,532 | 11/1954 | Hill et al. . |
| 4,024,804 | 5/1977 | Hanson .............. 56/341 X |
| 4,619,106 | 10/1986 | Van Der Lely .............. 56/341 |
| 5,152,357 | 10/1992 | McLean et al. . |
| 5,661,961 | 9/1997 | Westhoff et al. .............. 56/341 X |

FOREIGN PATENT DOCUMENTS

| | | |
|---|---|---|
| 1 936 188 | 8/1970 | Germany . |
| 92 06 232 U | 8/1992 | Germany . |
| 92 11 256 U | 12/1992 | Germany . |
| 42 32 989 A1 | 4/1994 | Germany . |

*Primary Examiner*—Heather Shackelford
*Attorney, Agent, or Firm*—Michael J. Striker

[57] ABSTRACT

A drive system for an agricultural large baler with the device for picking up harvested product from field, a device for further transportation of the harvested product a pressing chamber, a pressing chamber, a binding device, as well as a discharging device for discharge of a finally binded bale, the drive system has a power take-off associated with a tractor for displacing the large baler, an input shaft, transmission means provided between the power take-off and the input shaft and including a pre-switching transmission which at an inlet side is drivingly connected with the power take-off and at an outlet side is connected to the input shaft with a hinge shaft, the pre-switching transmission having at least one drive.

12 Claims, 3 Drawing Sheets

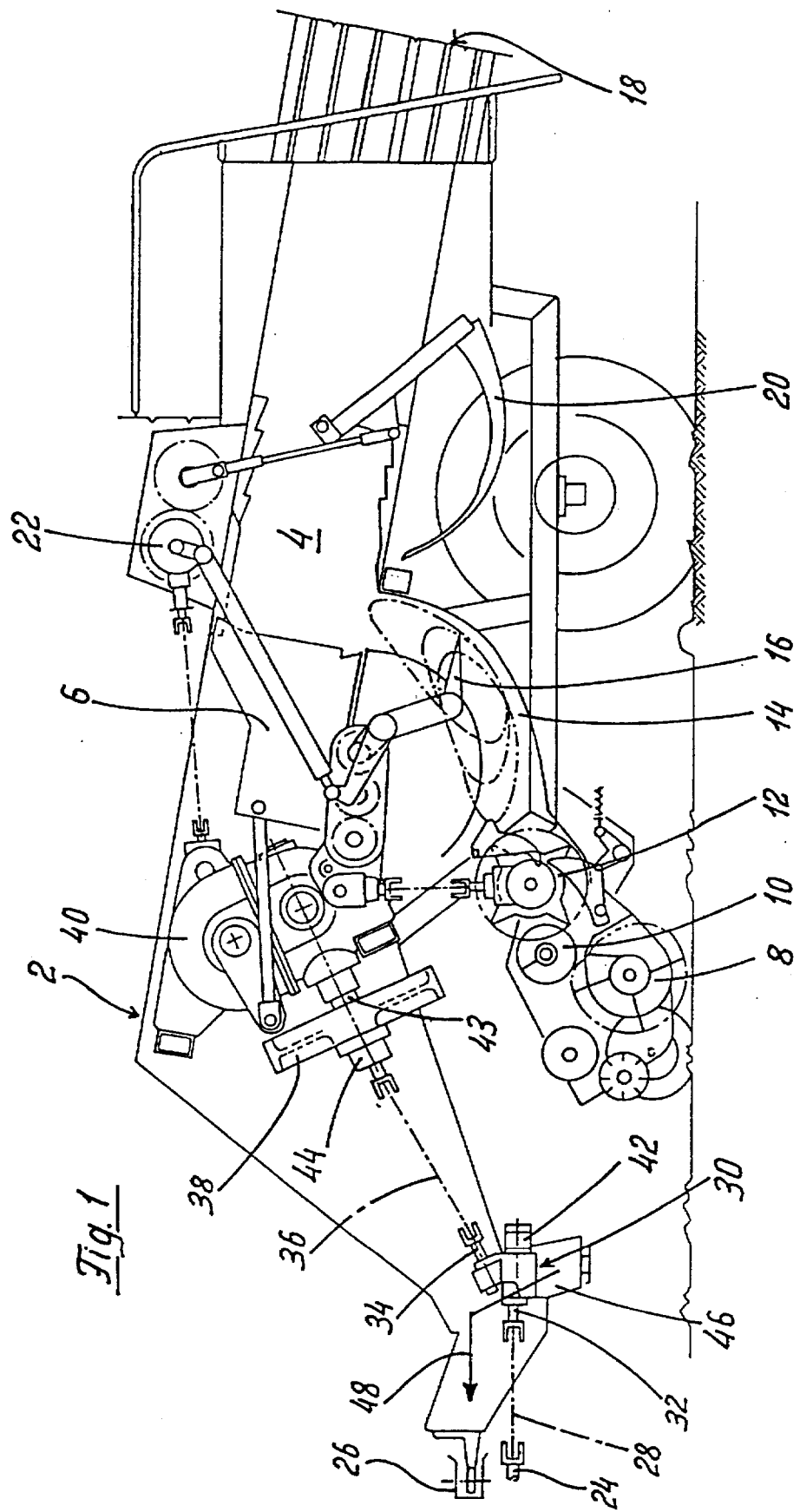

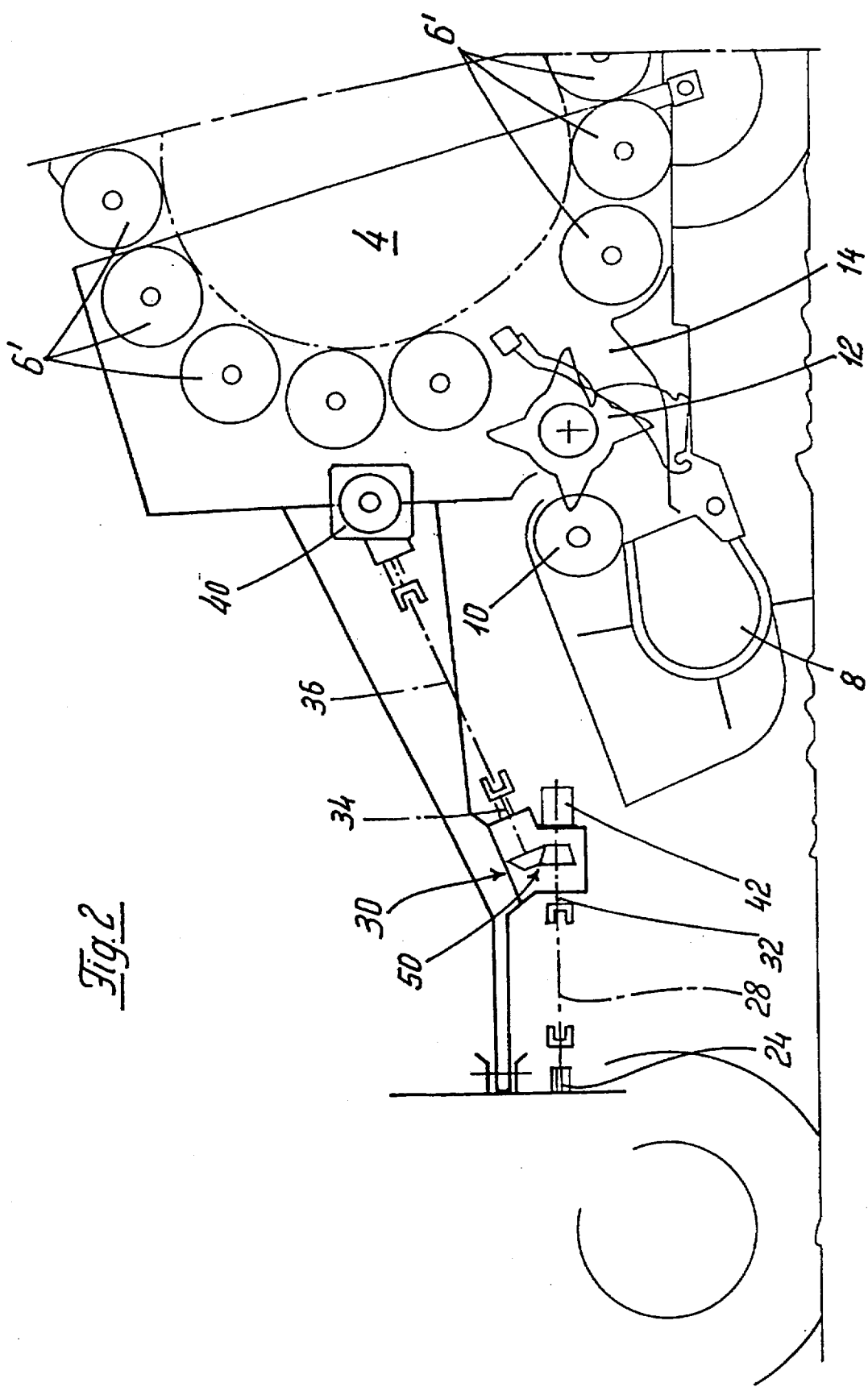

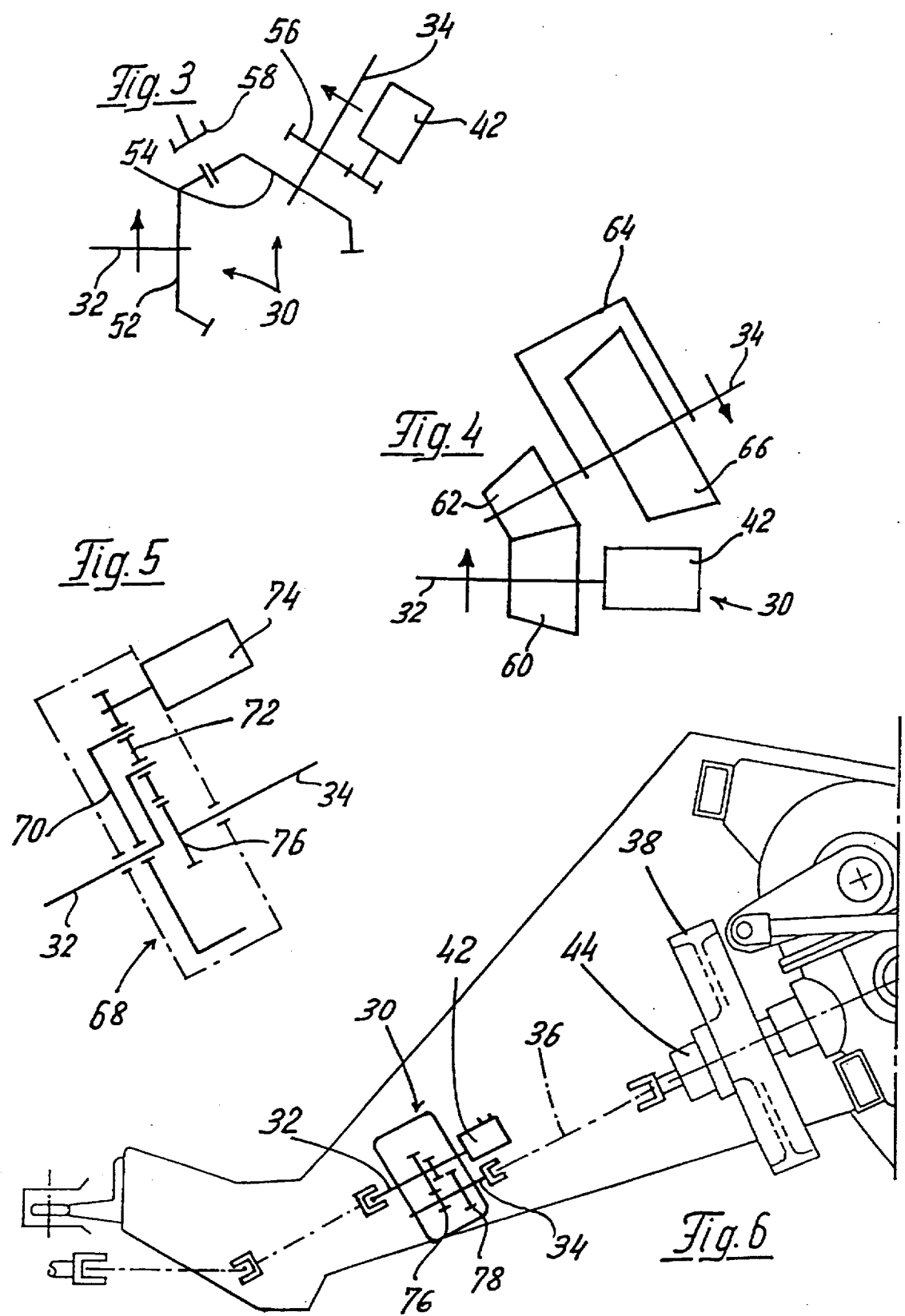

DRIVE SYSTEM FOR AGRICULTURAL LARGE BALER

BACKGROUND OF THE INVENTION

The present invention relates to a drive system for an agricultural large baler with a device for picking harvested product from a field, a device for further transporting the harvested product to a pressing chamber, a pressing chamber, a binding device, as well as a discharge device for discharging the finally bound bales.

Such a large baler is disclosed for example in the patent document DE 92 06 232. The large baler shown in this reference includes an arrangement for automatic interruption and subsequent pre-switching of the drive train, located between the flywheel and the main transmission, for protecting the components of the large baler from an overloading. If the drive train in such a large baler is interrupted or the power pickup of the tractor is suspended to stop the working elements of the large baler, there is the disadvantage that in addition to the mechanical drives which transmit the drive force through for example toothed gears, shafts and chains, also the hydraulic drive must be stopped for example for the upward and downward movement of the pickup device, for the pressure chamber additional adjustment, for opening of a rear flap in a round baler, the bale pressing out element, the bale constricting element, or the binding device. The reason is that the hydraulic pumps are usually mounted on the main transmission of the baler or after it, and after the switching-off do not have any drive power.

U.S. Pat. No. 2,676,532 discloses a construction in which a hydraulic pump is arranged near a tractor and is driven through a wedge rim. Such a design of the drive has however the disadvantage that it is dirt-sensitive and maintenance-intensive. More seldom the hydraulic supply is performed through the tractor, in which case dirtying problems arise because of the plug coupling. Partially, in this case hydraulic pressure accumulators are required on the baler or devices for an emergency hydraulic operation, which are expensive and need maintenance.

A further disadvantage of the prior art is that the input shaft of the main transmission is regularly higher than the drive end of the power take-off, while the hinge shaft which transmits the drive force from the power take-off to the input shaft of the main transmission must be arranged during the operation of the baler inclined to bending angles on the hinge locations. Due to this arrangement, the bending potential of the hinge shaft is used partially, a higher wear occurs on its hinges, and the force flux is not optimal. Also, different machine rotary speeds and eventually a reverse in the known drive systems are not easy to realize. The patent document DE 19 36 188 discloses an intermediate lock transmission, which can be plugged between the drive shafts in two ways to provide rotary speeds of 540 or 1000 revolutions per minute for the drive of an agricultural machine. The disadvantages of the proposed plug transmission are that, no connecting possibility for a hydraulic pump is provided and the hinge shafts can not be optimally oriented.

SUMMARY OF THE INVENTION

Accordingly, it is an object of the present invention to provide a drive system for an agricultural large baler, which avoids the disadvantages of the prior art.

In keeping with these objects and with others which will become apparent hereinafter, one feature of present invention resides, briefly stated, in a drive system for an agricultural large baler, in which in a drive train between the power take-off of the tractor and an input shaft, a pre-switching transmission is arranged in a transmission of the large baler, so that at the input side it is drivingly connectable with the power take-off and at the output side it is drivingly connectable with a hinge shaft for an input shaft of a transmission, and at least one bevel driving element with an angular offset is arranged in the pre-switching position.

With this arrangement, it is possible to compensate the height offset between the power take-off and the input shaft of a transmission of the large baler by an angular offset of the bevel element and so that an optimal orientation of the hinge shaft is obtained. Between the power take-off and the pre-switching transmission, at least one hinge shaft can be arranged to maintain an optimal mounting position and a high bending angle range.

A driven shaft of the pre-switching transmission can be drivingly connected with a driving shaft of a hydraulic pump. An advantage of such an arrangement is a good accessibility of the hydraulic pump in the event of repairs or maintenance. It is very important however that with such an arrangement it is possible to maintain the working pressure in the hydraulic system, while coupling devices in subsequent drive trains can interrupt the force flux because of overload or from other reasons. In accordance with a preferable embodiment, the input shaft of the pre-switching transmission corresponds to the drive shaft of the hydraulic pump. In this case both functions of the input shaft of the pre-switching transmission and the drive shaft of the hydraulic pump are performed by a single input shaft. Presumption is however that at least one disengaging coupling is arranged after the pre-switching transmission so as not to loose the drive force for the hydraulic circuit during the response of the switching off coupling. It does not play any role whether the disengaging coupling is associated with the fly wheel, the pressing piston, the transporting or cutting device or other components of a large baler.

In accordance with a further embodiment of the present invention, the pre-switching transmission is available with more than one transmission stage. Thereby it is possible to drive the large baler with other rotary speeds than 1000 revolutions per minute. It can be for example desirable to run the large baler for processing of dry grass faster, for example with the speed of 1,200 revolutions per minute, in order to better unload the capacity of the large baler. A high rotary speed of the hinge shaft over 1,000 revolutions per minute provides a higher energy of the flywheel, wherein the rotary speed behind the flywheel can be further reduced by suitable gear ratio. On the other hand, under certain conditions, for example in heavy silage, it can be advantageous to provide a gear ratio, with which the rotary speed of the hinge shaft is under 1,000 revolutions per minute, for example 850 revolutions per minute. It is also desirable to be able to reverse the drive of the large baler to eliminate stoppages, for example in the cutting device or in the transporting passage. This is possible when one stage of the pre-switching transmission rotates the hinge shaft in one direction than one or several other stages of the pre-switching transmission. During reversing of the drive of the large baler, naturally a free running of the flywheel must be blocked in a known manner, so as to be able to transmit the reverse drive force to the associated working elements of the large baler.

A planetary transmission can be arranged additionally in the pre-switching transmission. The advantage of the planetary transmission, with which through a second drive such as for example a hydraulic or electric motor its drive force is supplied into the planetary transmission, resides in that the output rotary speed of the pre-switching transmission is variable steplessly, depending on the design also in forward or rearward direction. Moreover, a planetary transmission can be small since the drive forces are transmitted being uniformly distributed over several planetary gears.

In accordance with a preferable embodiment, the switching transmission is remotely switchable. The switching actuation can be performed electronically through an operator unit which transmits the operator signals through a cable, ultrasound or infrared or other means to a switching means, mechanically, hydraulically or a combination of these possibilities for actuation.

When either the high wear of the hinge shaft with not optimal arrangement in the case of a height offset between power take-off and the input shaft must be taken into consideration for a transmission of the large baler or the height offset is low or is not available at all, the conical gear with angular offset can be dispensed with and instead a switching transmission can be composed of at least one toothed gear stage with inwardly engaging gear teeth. A hydraulic pump can be driven through a toothed gear stage or through an extension of a shaft.

In order to obtain a high reliability of the possible transmission steps, it is further proposed to arrange the pre-switching transmission releasably in the drive train, so as to exchange the pre-switching transmission with different transmission stages. Also, in the repair cases the large baler is spared during greater interruption times.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view showing an agricultural large baler in form of a cuboid baler;

FIG. 2 is a side view showing an agricultural large baler in form of a round baler;

FIG. 3 is a view schematically showing an inventive angle drive with a rotary direction reverse;

FIG. 4 is a view schematically showing an inventive angle drive with the drive in the same direction;

FIG. 5 is a view showing a pre-switching transmission with a planetary transmission; and FIG. 6 is a view showing a pre-switching transmission without an angle drive.

DESCRIPTION OF PREFERRED EMBODIMENTS

An agricultural large baler 2 is shown in FIG. 1. It has a bale pressing chamber 4 with a pressing piston 6 which is reciprocatingly movable in the pressing chamber. A picking up device 8 is located under the main transmission. It picks up the harvested product and supplies it by lateral transporting screws 10 centrally to a cutting device 12. From there, the harvested product is further transported into the transporting passage 14. It is accumulated in the transporting passage and is thrown by a transporting device 16 as a discharge portion into the bale pressing chamber 4, when the piston 6 during its cyclical movements releases the supply opening of the bale pressing chamber 4. In the bale pressing chamber 4 the supplied discharge portion is pressed by the stroke movement of the piston 6 against the previously pressed product, so that it is compacted and finally displaced with the previously compressed product in direction toward a discharge end 18 of the bale pressing chamber 4. In response to a release signal, a binding needle 20 transports by a turning movement a binding thread through the bale strand to a binding device 22. In the binding device the binding thread is cut and knotted. The finally knotted bale can then slide off the discharge end onto the field.

For the invention, it plays no role whether a cutting device 12 is available, of whether the transporting device 16 operates in the described way or another way known from the prior art, for example as rotary conveyor, or whether several transporters are available, or whether the transporting device performs one or more stroke movements during a pressing stroke of the piston 6. The above described mechanisms for the operation as a drive system are generally known.

The drive system takes the drive forces from the power take-off 24 of a tractor, on which the large baler 2 is suspended through a suspending device 26 as shown in FIG. 1. A hinge shaft 28 is plugged on the power take-off 24 and opens into a pre-switching transmission 30. The pre-switching transmission 30 includes an input shaft 32 and an output shaft 34 which is drivingly connected with the hinge shaft 36. A flywheel 38 as well as a transmission housing 40 with a transmission input shaft 43 are arranged on the hinge shaft 36. All mechanical components of the large baler 2 are driven from the transmission housing 40. It can be seen that the input shaft 32 and the output shaft 34 are arranged at an angle relative to one another. This is possible with the use of a bevel drive with an angular offset arranged in the pre-switch transmission 30.

A hydraulic pump 42 provided with not shown supply and discharge conduits is arranged on the pre-switching transmission 30. It operates for various hydraulically-actuated functions, such as for example lifting and lowering of the pick-up device 8, a bale ejector, a pressing chamber reduction or a height adjustment of the bale chute. It can be seen that the hydraulic pump 42 is drivingly connected directly with the input shaft 32. A disengaging coupling 44 is arranged in the flywheel 38. In the event of overloading of the subsequent drive system, it interrupts the driving connection between the hinge shaft 36, and the input shaft 42 and the drive system therefore is protected from damages. Several stages can be provided in the pre-switching transmission 30, including among others, also a reverse stage. Also, a planetary transmission can be located in the pre-switching transmission 30. A switching box 46 is located in the switching transmission 30 and provided with a movable switching lever for actuation of an electric motor. The electric motor transmits the transmission value of the switching lever through a cable 48 to an operator box at the tractor, from which also adjustment commands are transmitted to the switching box through the cable 48. The electronic communication of the data can be performed through a CAN Bus Network.

FIG. 2 shows an agricultural large baler 2 in form of a round baler. It has a bale pressing chamber 4 with rotatably supported rollers 6' which peripherally limit the chamber and supply the harvested product to compress it into a bale. The harvested product is lifted from the ground by a picking device 8, then centrally assembled by the transporting screw 10, and supplied further to the cutting device 12. From there it is further transported through a transporting passage 14 into the bale pressing chamber 4. The drive of the large baler 4 is performed from the power take-off 24 of the tractor through a hinge shaft 28 to the input shaft 32 of the pre-switching transmission 30, which transmits the drive force through a bevel drive 50 with an angular offset to the output shaft 34. The hydraulic pump 42 is arranged on the input shaft 32. The drive force is transmitted from the output shaft 34 through a hinge shaft 36 to the transmission housing 40, in which a not shown disengaging coupling is integrated. The operation of the pre-switching transmission corresponds to the operation of the same unit in FIG. 1.

FIG. 3 schematically shows a pre-switching transmission 30. A spur level gear 52 is mounted on the input shaft 30 and engages with a [plate] spur level gear 54 which is mounted on the output shaft 44 for joint rotation with it. The rotary movement of the input shaft 32 is transmitted in the same rotary direction to the output shaft 34. A hydraulic pump 42 is driven in FIG. 3 through a toothed gear set 56 which in turn is drivingly connected with the output shaft 34. A rotary direction reverse can be performed with this pre-switching position 30 by switching a toothed gear 58 between the [plate] spur level gears 52, 54. This can be performed for example when the large baler is stopped, but also can be performed during the travel by a manually or automatically released coupling.

FIG. 4 shows a version of the pre-switching transmission 30 in which two toothed gears 60, 62 mounted on the shaft 32, 34 engage with one another and therefore transmit the driving force. In this version a rotary direction reverse is performed. A hydraulic pump 42 is connected with the input shaft 32. A switching between two stages can be performed for example so that the output shaft 34 is moved by a switching lever 64 to such a position that the smaller toothed gear 62 (or the greater toothed gear 66) engages with the toothed gear 60 and thereby a different transmission ratio with respect to the toothed gear 62 is obtained.

FIG. 5 shows an embodiment with the use of a planetary transmission 68. The input shaft 32 which directly or indirectly takes the drive force through a bevel drive from a power take-off, is drivingly connected with the web of planetary gears 72 of the planetary transmission 68. A hollow gear 70 which is supported rotatably on the input shaft 32 has inner teeth which engage with the teeth of the planetary gears 72 as well as outer teeth on which a drive source 74 acts. By variation of the rotary speed of the drive source 74, simultaneously the rotary speed of the output shaft 34 which is connected with the sun gear 76 for joint rotation, is varied. As a rule, the drive source 74 is stopped, and in the preferable embodiment it is driveable forwardly and rearwardly so that a reverse of the drive of the large baler is possible. The drive source 74 can be provided with a pawl for preventing idle power by passive rotation of the drive 74.

FIG. 6 shows a pre-switching transmission in which no angular drive is integrated. The pre-switching transmission 30 includes several toothed gear sets 76, 78 which transmits different rotary speeds to the output shaft 34 and the hinge shaft 36. A hydraulic motor 42 is arranged in driving connection on the input shaft 32. A disengaging coupling 44 is located after the output shaft 34 and located in the flywheel 38.

It will be understood that each of the elements described above, or two or more together, may also find a useful application in other types of constructions differing from the types described above.

While the invention has been illustrated and described as embodied in drive system for agricultural large baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An agricultural machine, comprising an agricultural large baler displaceable by a tractor and having means for picking up harvested product from a field, a pressing chamber, means for transporting the harvested product to said pressing chamber, a binding device for binding pressed bales, and discharging means for discharging finally bound bales, and a drive system for driving said agricultural large baler; said drive system including a power take-off connected with the tractor and provided with a first hinge shaft, a second hinge shaft connectable with an input shaft of the baler and arranged at an angle relative to said first hinge shaft, and a transmission connecting said hinge shafts with one another, said transmission including a transmission input shaft connected with said first hinge shaft, a transmission output shaft connected with said second hinge shaft, and a bevel drive with an angular offset connecting said transmission input shaft with said transmission output shaft.

2. A drive system as defined in claim 1, and further comprising means forming a drive train, said transmission which connects said hinge shafts with one another being releasably arranged in said drive train.

3. A drive system as defined in claim 1, and further comprising a hydraulic pump having a drive shaft connected with said transmission output shaft.

4. A drive system as defined in claim 1; and further comprising a disengaging coupling arranged after said transmission which connects said hinge shafts with one another.

5. A drive system as defined in claim 1, wherein said transmission which connects said hinge shafts with one another has a plurality of stages.

6. A drive system as defined in claim 1, wherein said stages of said transmission which connects said hinge shafts with one another are formed so that at least one of said stages rotates said hinge shaft in a different direction than one or more other stages.

7. A drive system as defined in claim 1, wherein said transmission which connects said hinge shafts with one another is formed so that it provides a rotary speed of said power take-off of 1000 revolutions per minute and a rotary speed of said hinge shaft of over 1000 revolutions per minute.

8. A drive system as defined in claim 6, wherein said transmission which connects said hinge shafts with one another is formed so that it provides a rotary speed of said power take-off of 1000 revolutions per minute and a rotary speed of said hinge shaft of 1000 revolutions per minute.

9. A drive system as defined in claim 1; and further comprising a planetary transmission arranged in said transmission which connects said hinge shafts with one another.

10. A drive system as defined in claim 1; and further comprising means for remotely switching said transmission which connects said hinge shafts with one another said means for remotely switching being a means selected from the group consisting of mechanical means, electronic means, hydraulic means, and their combination.

11. A drive system as defined in claim 1; and further comprising a hydraulic pump which is driven through an additional toothed gear stage.

12. A drive system as defined in claim 1; and further comprising hydraulic pump which is driven through an extension of one of shafts of said transmission which connects said hinge shafts with one another.

* * * * *